United States Patent [19]

Katzschner

[11] Patent Number: 4,503,437
[45] Date of Patent: Mar. 5, 1985

[54] INK JET COLOR-CODING METHOD FOR LEADS

[75] Inventor: Wolfgang Katzschner, Munich, Fed. Rep. of Germany

[73] Assignee: Siemens Aktiengesellschaft, Berlin & Munich, Fed. Rep. of Germany

[21] Appl. No.: 411,016

[22] Filed: Aug. 24, 1982

[30] Foreign Application Priority Data

Oct. 26, 1981 [DE] Fed. Rep. of Germany ....... 3142374

[51] Int. Cl.³ .................... G01D 15/18; G01D 15/16; B41F 17/00
[52] U.S. Cl. ........................................ 346/1.1; 346/75; 346/140 R; 101/35
[58] Field of Search ................ 346/75, 1.1, 75, 140 R; 427/299, 402, 407.12, 412.5; 101/35

[56] References Cited

U.S. PATENT DOCUMENTS 3,787,881  1/1974  Duffield .............................. 346/75
4,029,006  6/1977  Mercer .............................. 101/35 X
4,272,771  6/1981  Furukawa .............................. 346/75
4,273,803  6/1981  Jöhnk .................................... 427/58
4,315,053  2/1982  Poth et al. ..................... 428/423.7 X
4,412,225  10/1983  Yoshida et al. ................... 346/1.1 X Primary Examiner—E. A. Goldberg
Assistant Examiner—Gerald E. Preston
Attorney, Agent, or Firm—Hill, Van Santen, Steadman & Simpson

[57] ABSTRACT

A method for labelling or printing on an item such as a lead (electrical as well as optical fiber) with an ink printer wherein ink spots are ejected from a plurality of jets which are mounted in a matrix and which are separately controllable. In a first step a roll of ink spots is applied and gaps exist between the ink spots and at a following second step further spots are applied into the gaps due to the longitudinal displacement of the item or lead which has occurred. The method is particularly valuable for labelling light waveguide fibers wherein various indicia of color-codes can be printed thereon.

8 Claims, 4 Drawing Figures

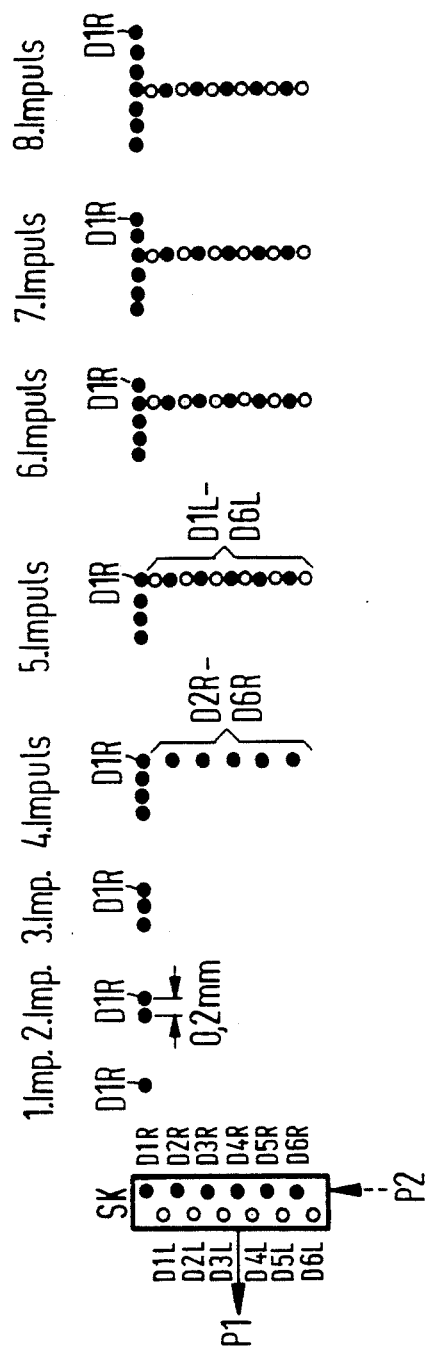

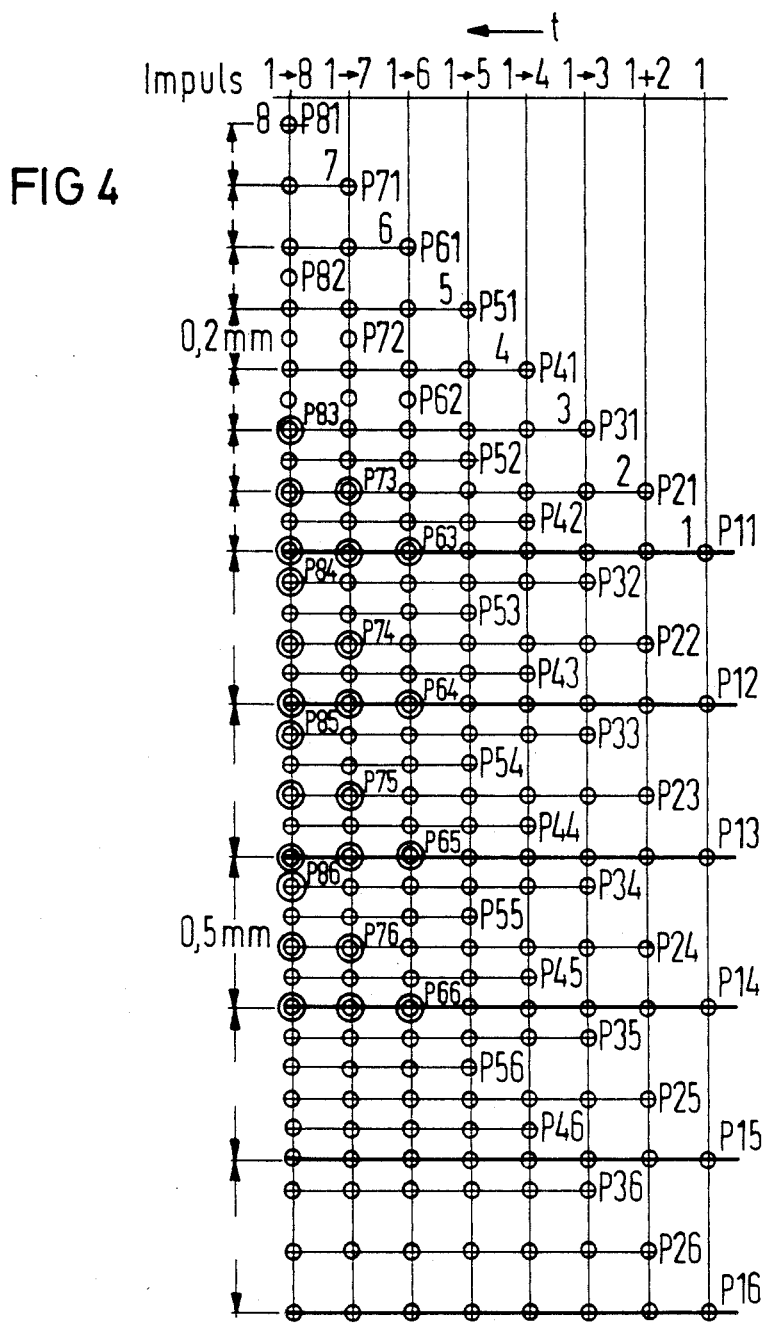

4,503,437

INK JET COLOR-CODING METHOD FOR LEADS

BACKGROUND OF THE INVENTION

1. Field of the Invention

This invention relates in general to a method for labelling or printing on an item such as a lead and particularly such as a light waveguide fiber by using an ink printer wherein color spots or ink spots are emitted from a plurality of jets which are separately controllable.

2. Description of the Prior Art

German OS No. 2,944,103 discloses a method for printing indicia on leads wherein the control of the ink printer is accomplished with a computational unit to which means for measuring the speed of a skein-like product is supplied. The jets of the ink printer are mounted at right angles relative to the direction of motion of the skein-like product. With the use of a plurality of jet rows, the individual jets are mutually offset and are disposed in the gaps. It is expedient for clear printing for the points generated by the jets to lie as close together as possible. However, it is technically difficult due to the fundamental physical conditions which presumes that the jets be mounted in a very tight proximity to each other and this requires a very compact structure which is very complex and difficult to realize in actual designs.

SUMMARY OF THE INVENTION

It is an object of the present invention which relates to a method for marking or printing on a moving light fiber to disclose a method in which the production of closely spaced points of identification is possible in a very simple and versatile manner by using free programming. The invention provides that a series of color spots are applied in a first work step with gaps existing between the color spots and in a second work step further color spots are applied into the gaps by using the longitudinal displacement of the item such as a lead which has occurred between the two steps.

In the invention, thus an allocation between the raster given by the position of the jets and the displacement of the recording carrier is accomplished whereby the two cooperate such that a tight and closely spaced plurality of points result. The jets can be disposed in a coarser raster because the filling of the gaps occurs during the second work step and the longitudinal displacement of the workpiece is precisely of a size such that the gaps are filled.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 3 illustrates a further sample embodiment of the invention wherein the gaps are filled; and FIG. 4 is a diagram for labelling particularly sensitive color material with a gradual rise and fall of the thickness or ink of the written characters at the outer ends.

DESCRIPTION OF THE PREFERRED EMBODIMENTS

Figure 1:
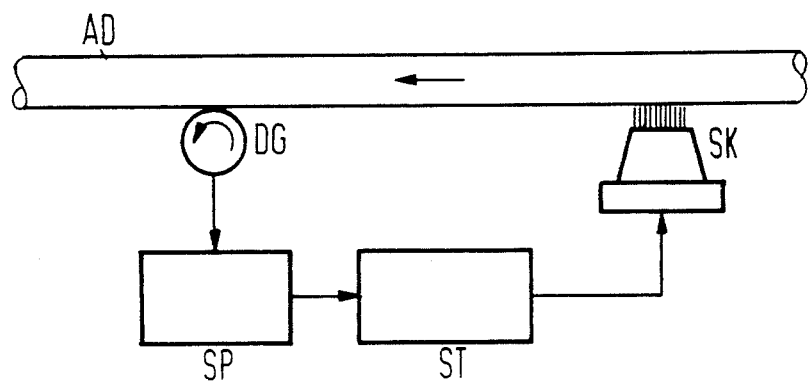
FIG. 1 illustrates schematically the structure of the device of the invention for labelling an item such as a lead.

FIG. 1 illustrates an item upon which printing is to be placed which might preferably be a light waveguide fiber provided with a protective coating and is identified as AD. The waveguide fiber AD moves from right to left relative to FIG. 1 and an angular momentum generator DG engages and is rotated by the light fiber AD and produces pulses which are timed in synchronism with the forward feed speed of the light waveguide AD and in a particular example might be one pulse per specific unit length. It is assumed for the following sample embodiment that one pulse is emitted by the angular momentum generator DG to the memory means SP for each 0.2 mm of feed movement. The character pattern which is to be respectively applied to the lead fiber waveguide AD is input into the memory SP in a freely programmable manner. The memory SP supplies generator control instructions to a control means ST which actuates the printing head SK which is preferably designed as an ink printer. The individual jets in the ink printer head are mounted in a matrix arrangement in rows and columns.

Figure 2:
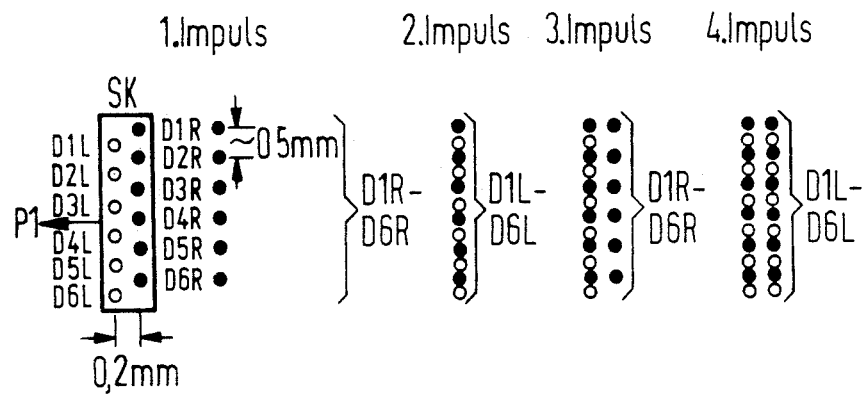
FIG. 2 illustrates a first sample embodiment of the invention for filling gaps during a second work step.

A sample embodiment of a printing head SK is illustrated in FIG. 2 wherein the printing head has two rows of jets which are a right row with six respectively jets D1R through D6R and a left row with six jets D1L through D6L. The jets of the right and left rows are mutually offset from each other such that the jets of the left row are located in the gaps between the jets of the right row and vice versa. It is assumed that the jets emit ink in the direction toward the plane of the drawing and it is further presumed that the lead AD moves from the right toward the left relative to FIG. 2. So as to better distinguish the individual writing operations from one another, the circular color spots produced by the right jet row D1R through D6R are illustrated as black points and the color spots produced by the left row D1L through D6L are shown as circles. The spacing between the individual jets of a row is approximately 0.5 mm and the spacing between the two adjacent rows corresponds to the assumed feed of 0.2 mm per control pulse and is equal to 0.2 mm. Based on the first pulse, the right row D1R through D6R of jets is keyed and, thus, a row of color spots will be written on the lead AD wherein the spots have center-to-center spacing of approximately 0.5 mm. When the next pulse occurs, the lead will have moved by 0.2 mm toward the left as shown by the arrow P1 so that the color spots of the first pulse will lie precisely aligned with the left jet row D1L through D6L. The second pulse causes a further row of color spots which are indicated in the drawing by circles to be written into the gaps of the already existing color spots so that an approximately continuous line will result. It is presumed that the diameter of the color spots is approximately equal to 0.3 mm.

When a second line is to be written next to the first line which exist after the second pulse and which practically represents a half ring on the lead AD, then the right jet row D1R through D6R is again keyed by a third pulse at a distance of 0.2 mm relative to the first line and writes a sequence consisting of six color spots. When the fourth pulse occurs, the lead AD will have moved toward the left by 0.2 mm so that the gaps between the color spots of the third pulse will be closed when the left jet row D1L through D6L occurs. Thus, two half rings or semi-circles printed adjacent to each other will have been printed on the circular lead AD and these will flow or bleed into one another with the above given dimensons. Thus, as a result of the connected lines, an overall color spot will be built up on the lead AD which depends on the number of pulses which have been successively employed for energizing the rows of the jet printers. When desired for example, if the overall width of the color half ring should be approximately 1.6 mm, then sixteen pulses will be necessary to produce such a printed line on the lead AD.

The pulse sequence and the distribution of the jet control are indicated in FIG. 3 for the situation when the letter "T" is to be printed. Assuming the combination and distribution of jets in the printing head SK is as illustrated in FIG. 2 and movement of the lead AD is from the right toward the left. At the first pulse, only the first jet D1R is keyed and prints a first color spot. When the second pulse occurs, the jet D1R is again keyed and prints a further color spot at a distance of 0.2 mm from the first. The same occurs at the third pulse and at the fourth pulse so that a total of four color spots which are aligned adjacent to each other will exist at the end of the fourth pulse as shown under number 4 in FIG. 3. Simultaneously, at the same time of the fourth pulse, however, not only the first jet D1R will be energized, but the remaining jets D2R through D6R of the right row of jets are also energized. This causes a vertical line which extends at right angles relative to the longitudinal direction of the lead AD to be printed and its length will depend on the number of jets of the right row. At the time of the fifth jet the left jet row D1L through D5L will be energized and as a result, the gaps which exist between the color spots from the first jet row will be filled up as is indicated by the color spots of the left jet row illustrated at circles under 5 in FIG. 3. When the sixth pulse occurs, only the first jet of the right jet row D1R will be keyed and this will also be the case for the seventh and eighth pulses as illustrated under 7 and 8 in FIG. 3. After the eighth pulse, the desired character "T" will have been printed on the lead AD as shown under 8 in FIG. 3. Thus, although the jets D1R through D6R and D1L through D6L are mounted at a greater distance from each other a tightly closed type face can also be generated in the vertical direction, in other words, at right angles to the longitudinal feed. The spacing of the colors spots in the horizontal or feed direction which occurred from the first through the third pulse is solely given by the clock sequence of the angular momentum generator DG and, thus, can always be kept small.

After printing a Figure or a letter or, respectively, a number, a series of "empty strokes" will follow during which the pulses supplied by the angular momentum generator DG are suppressed and are not supplied to key the printing head SK. After a series of such empty strokes, for example five empty strokes, the next symbol can be printed on the lead AD and the system and method will be repeated as illustrated in FIGS. 2 and 3 for the first letter.

When the lead AD moves past, for example, the right jet row D1R through D6R as illustrated in FIG. 3 in a vertical direction as is indicated by the broken line arrow P2 then a constant transition in the labelling of the lead surface can be achieved in a particular simple manner. Such a transition is particularly of interest when light waveguide fibers are to be labelled since these are particularly sensitive to the so-called "micro-flections". Such "micro-flections" can be produced in that the corresponding color rings or characters are applied to the thin light waveguide fibers coated with a protective layer and, thus, the moment of inertia is changed. When this occurs, abruptly and periodically, as is usually the case, then there is a danger of reducing the transmission properties of the waveguides.

FIG. 4 illustrates a pulse plan and the point distribution when the time axis proceeds from right to left and the direction of the motion of the light waveguide fiber AD proceeds from the top toward the bottom. At the first pulse, the complete jet row D1R through D6R is keyed and produces the points P11 through P16. After a shift of the lead AD by 0.2 mm, the next second pulse occurs which writes the points P21 through P26. At the third pulse, the points P31 through P36 are written and the points P41 through P46 are printed by the fourth pulse and the points P51 through P56 are printed at the fifth pulse. At the end of the fifth pulse, thus a point sequence, of corresponding lengths which have been printed more densely in the center will exist.

At the sixth pulse, the color spots P61 through P66 are printed and the color spots P63 through P66 strike already existing points which are the points P11 through P14 so that a double ink application occurs at these locations.

When the seventh pulse occurs, the color or ink spots P71 through P76 are produced and the color or ink spots P73 through P76 coincide with already existing ink spots which are P21 through P24 and, thus, two ink spots will lie on top of each other at these locations.

During the eighth pulse, the ink spots P81 through P86 will be written and the ink spots P83 through P86 coincide with already existing ink spots P31 through P34 and, thus, double application of ink will occur on these locations. When the ink row existing after the eighth pulse is observed, it turns out that beginning from the outside with the ink spot P81 a gradual increase in the density of the ink spots with a larger gap between P81 and P71 occurs then, for example, between P61 and P82 as well as in view of the positions of the layers which lie on top of each other and the layers increase from the outside toward the inside and then again decrease from the inside toward the outside.

It is advantageous when printing occurs in such manner that the lead AD is moved for each writing clock fraction of the spacing of two simultaneously actuated jets. An expedient dimensioning consists that the fraction has the value of a rational fraction. Care should also be taken that the diameter of an ink spot is kept smaller than the shift of the lead per writing clock pulse. When the cross-sectional profile of the ink application is observed, than a gradual rise of the inking up to a maximum value occurs and then a gradual decrease occurs. With the gradual rise and gradual decrease, the periodic mechanical disruption of the outer cover is reduced to a degree such that practically no micro-flection effects will be observed.

A particularly uniform ink application can also be achieved in that the lead can be moistened before printing for example, by passing it through a reservoir filled with liquid. This liquid and the ink fluid should be matched to each other such that they mutually mix with ease. With thinly moistened leads, the possible ability results that despite a single sided printing it is not only a half-ring but rather a full ring which results because the ink will flow to the backside of the lead AD around the moistened portion where printing did not occur but which flows due to the moistened portion.

When the control of the jet rows is programmed in a manner such that an obliquely placed bar arises then depending upon the angle of the bar relative to the direction of motion of the lead, sharper or steadier transitions will result. The point spacing in the direction of motion of the lead AD can be set by means of gearing up or gearing down of the angular momentum generator DG. Large jet openings mean that more ink is used and reducing the length of the electrical pulses results in less ink. More empty strokes between the bars result in larger ring spacings and two bars in succession result in longer rings. Thus, the code for the labelling can be altered freely and programmable in a versatile manner.

If remaining gaps between individual ink spots or characters would still be disruptive, then these can be closed by using a colorless lacker or clear lacker in the gaps in a manner such that a completely uniform outside diameter of the lead is assured. This is particularly advantageous because it avoids micro-flection in optical fibers and is expedient with electrical conductors because no continuous change of the coupling values between adjacent leads after stranding will occur. The clear lacker should expediently exhibit approximately the same electrical properties as the ink.

Although the invention has been described with respect to preferred embodiments, it is not to be so limited as changes and modifications can be made which are within the full intended scope of the invention as defined by the appended claims.

I claim as my invention:

1. Method for labelling a moving lead by forming imprints, particularly a light waveguide fiber, by means of an ink printer by means of which color spots from a plurality of nozzles in at least two rows and aligned to extend transversely of the direction of movement of said lead are simultaneously ejected onto said lead, whereby said nozzles are separately controllable such that said at least two rows of nozzles produce color spots which are applied in successive work steps, and gaps between said spots are closed by means of longitudinal movement of said leads which has ensued between said work steps and said color spots at least partially overlap, characterized in that the individual nozzles of said two rows of nozzles are offset transversely of each other relative to the direction of movement of said lead and rows of color spots are applied parallel to the feed direction of said lead and the longitudinal feed is selected such that, beginning from the outer region of the color application, a gradual decrease in the width of the gaps between said color spots is achieved and at least two color spots are applied on top of one another in the middle region of the imprint being formed, whereby the cross-sectional profile of the color application is designed with a gradual rise up to a maximum value and, following a gradual decrease.

2. A method according to claim 1, characterized in that the lead is moved a longitudinal distance between each printing operation which is longer than or approximately equal to the diameter of the ink spots.

3. A method according to claim 1, characterized in that the lead is moved during each printing step by a fraction of the spacing between two simultaneously actuated jets.

4. A method according to claim 3 characterized in that the fraction is a rational fraction.

5. A method according to claim 1, characterized in that the diameter of an ink spot is smaller than the movement of the lead between actuation of said jets.

6. A method according to claim 1, characterized in that the lead is moistened before ink application by means which apply a liquid in which the ink is soluble.

7. A method according to claim 1, characterized in that a change of the transition area is achieved by applying bars extending obliquely relative to the direction of motion of the lead.

8. A method according to claim 1, characterized in that gaps between the ink spots or printed characters are closed by applying a clear lacquer in a manner such that a uniform outside diameter results.

* * * * *